United States Patent
Jang et al.

(10) Patent No.: US 11,248,657 B2
(45) Date of Patent: Feb. 15, 2022

(54) TRIPOD CONSTANT-VELOCITY JOINT

(71) Applicant: ERAE AMS CO., LTD., Daegu (KR)

(72) Inventors: Dal Soo Jang, Daegu (KR); Jong Uk Seo, Daegu (KR)

(73) Assignee: ERAE AMS CO., LTD, Daegu (KR)

(*) Notice: Subject to any disclaimer, the term of this patent is extended or adjusted under 35 U.S.C. 154(b) by 280 days.

(21) Appl. No.: 16/471,682

(22) PCT Filed: Dec. 21, 2017

(86) PCT No.: PCT/KR2017/015218
§ 371 (c)(1),
(2) Date: Jun. 20, 2019

(87) PCT Pub. No.: WO2018/117679
PCT Pub. Date: Jun. 28, 2018

(65) Prior Publication Data
US 2019/0390718 A1  Dec. 26, 2019

(30) Foreign Application Priority Data
Dec. 21, 2016 (KR) .......................... 10-2016-0175657

(51) Int. Cl.
*F16D 3/205* (2006.01)
*F16C 29/04* (2006.01)
(Continued)

(52) U.S. Cl.
CPC ............ *F16D 3/2055* (2013.01); *F16C 29/04* (2013.01); *F16C 29/046* (2013.01);
(Continued)

(58) Field of Classification Search
CPC ........... F16D 3/2055; F16D 2003/2026; F16D 2003/22303; F16D 2003/22309;
(Continued)

(56) References Cited

U.S. PATENT DOCUMENTS 4,592,735 A * 6/1986 Orain ...................... F16C 29/04
464/111
4,741,723 A * 5/1988 Orain ...................... F16C 29/04
464/111
(Continued)

FOREIGN PATENT DOCUMENTS

FR         2628803 A2   9/1989
JP     58-200814 A  * 11/1983 ..................... 384/49
(Continued)

OTHER PUBLICATIONS

International Search Report for PCT/KR2017/015218 dated Apr. 5, 2018 (PCT/ISA/210).

*Primary Examiner* — Greg Binda
(74) *Attorney, Agent, or Firm* — Sughrue Mion, PLLC (57) ABSTRACT

A tripod constant-velocity joint includes: an outer joint member having a cavity elongated in a longitudinal direction and three roller tracks; an inner joint member having a center body and three journals outwardly radially protruded from the center body; and three roller assemblies respectively coupled to the journal in a state of being respectively disposed in the roller tracks. The respective roller assembly comprises: an inner race which is connected to the journal and is provided with a first inner ball groove and a second inner ball groove on both lateral sides thereof; a first ball array and a second ball array respectively having a plurality of balls which are respectively disposed in the first inner ball groove and in the second inner ball groove; and a ball cage which restricts movements of the first ball array and the second ball array in a longitudinal direction thereof.

8 Claims, 5 Drawing Sheets

(51) Int. Cl.
  *F16D 3/202* (2006.01)
  *F16D 3/223* (2011.01)
(52) U.S. Cl.
  CPC .. *F16C 2361/41* (2013.01); *F16D 2003/2026* (2013.01); *F16D 2003/22303* (2013.01); *F16D 2003/22309* (2013.01); *Y10S 464/905* (2013.01)
(58) Field of Classification Search
  CPC ............ F16D 2003/2023; F16C 29/046; F16C 29/04; F16C 2361/41; Y10S 464/905
  USPC .................................. 464/111, 132; 384/49
  See application file for complete search history.

(56) References Cited

U.S. PATENT DOCUMENTS

| | | | |
|---|---|---|---|
| 5,125,873 | A | 6/1992 | Welschof |
| 5,797,799 | A * | 8/1998 | Deschatrettes ....... F16D 3/2055 464/111 |
| 6,165,075 | A | 12/2000 | Kita et al. |
| 7,232,372 | B2 | 6/2007 | Nagatani et al. |
| 7,758,430 | B2 | 7/2010 | Yoon |

FOREIGN PATENT DOCUMENTS

| | | | |
|---|---|---|---|
| JP | 11-082532 | A | 3/1999 |
| JP | 2003130080 | A | 5/2003 |
| JP | 2008-039036 | A | 2/2008 |
| KR | 10-1998-0071229 | A | 10/1998 |
| KR | 10-2004-0053205 | A | 6/2004 |
| KR | 10-2007-0068498 | A | 7/2007 |

\* cited by examiner

FIG. 5

TRIPOD CONSTANT-VELOCITY JOINT

CROSS REFERENCE TO RELATED APPLICATIONS

This application is a National Stage of International Application No. PCT/KR2017/015218 filed Dec. 21, 2017, claiming priority based on Korean Patent Application No. 10-2016-0175657 filed Dec. 21, 2016.

TECHNICAL FIELD

The present invention relates to a tripod constant-velocity joint used in vehicles.

BACKGROUND ART

A drive shaft assembly is used that plays a role of power transmission in a drive system of a vehicle.

The drive shaft assembly consists of a drive shaft and a pair of constant-velocity joints which are provided on both sides thereof. A constant-velocity joint which is disposed at a side toward a transmission is called an inboard constant-velocity joint and a constant-velocity joint which is disposed at a side toward a driving wheel is called an outboard constant-velocity joint, and a tripod constant-velocity joint which is formed to be able to allow an axial displacement is generally used as the inboard constant-velocity joint.

The tripod constant-velocity joint includes an inner joint member having three journals, roller assemblies respectively coupled to the journals, and an outer joint member which receives the roller assemblies. In this regard, various types of the roller assembly have been introduced, and as an example a roller assembly having an inner ring, an outer ring and a needle bearing has been introduced. An articulation and an axial displacement may occur simultaneously while the tripod constant-velocity joint operates, and at this time the roller assembly coupled to the journal undergoes rolling in a roller track of the outer joint member to minimize a friction loss.

However, in a condition that an articulation and an axial displacement occur simultaneously, the outer ring of the roller assembly does not undergo a complete linear movement on a surface of the roller track but moves in a slanted state so as to increase friction, and this is one of reasons that cause shuddering in a sudden acceleration or a sudden braking of a vehicle. In particular, at a large articulation angle, the friction force becomes much larger to deteriorate NVH characteristics.

Prior document: Korea Patent Publication No. 10-2007-0068498 (publication date: 2007.07.02)

DETAILED DESCRIPTION OF THE INVENTION

Technical Problem

The present invention has been made in an effort to solve the above-mentioned problems and has an object to provide a tripod constant-velocity joint having an improved roller assembly to minimize the shuddering phenomenon.

Technical Solution

A tripod constant-velocity joint according to an embodiment of the present invention includes: an outer joint member having a cavity elongated in a longitudinal direction and three roller tracks; an inner joint member having a center body and three journals outwardly radially protruded from the center body; and three roller assemblies respectively coupled to the journal in a state of being respectively disposed in the roller tracks. The respective roller assembly comprises: an inner race which is connected to the journal and is provided with a first inner ball groove and a second inner ball groove on both lateral sides thereof; a first ball array and a second ball array respectively having a plurality of balls which are respectively disposed in the first inner ball groove and in the second inner ball groove; and a ball cage which restricts movements of the first ball array and the second ball array in a longitudinal direction thereof.

The first ball array may be disposed in a first ball track which is formed by the first inner ball groove and a first outer ball groove formed in a corresponding lateral side surface of the roller track and the second ball array may be disposed in a second ball track which is formed by the second inner ball groove and a second outer ball groove formed in a corresponding lateral side surface of the roller track. Further, the first ball track may be configured such that a sectional area thereof becomes larger in a direction toward an open side of the outer joint member and the second ball track may be configured such that a sectional area thereof becomes smaller in a direction toward the open side of the outer joint member.

Diameters of the plurality of the ball composing the first ball array may become larger in a direction toward the open side of the outer joint member and diameters of the plurality of the ball composing the second ball array may become smaller in a direction toward the open side of the outer joint member.

The first inner ball groove may be formed such that a bottom surface thereof becomes deeper in a direction toward the open side of the outer joint member and the second inner ball groove may be formed such that a bottom surface thereof becomes shallower in a direction toward the open side of the outer joint member.

The first outer ball groove may be formed such that a bottom surface thereof becomes deeper in a direction toward the open side of the outer joint member and the second outer ball groove may be formed such that a bottom surface thereof becomes shallower in a direction toward the open side of the outer joint member.

The first ball track may have a shape of a truncated cone being widened in a direction toward the open side of the outer joint member and the second ball track may have a shape of a truncated cone being narrowed in a direction toward the open side of the outer joint member.

Center lines of the first ball track and the second ball track may be parallel respectively with a longitudinal direction of the outer joint member.

A tripod constant-velocity joint according to another embodiment of the present invention includes: an outer joint member having a cavity elongated in a longitudinal direction and three roller tracks; an inner joint member having a center body and three journals outwardly radially protruded from the center body; and three roller assemblies respectively coupled to the journal in a state of being respectively disposed in the roller tracks. The respective roller assembly includes: an inner race which is connected to the journal and is provided with a first inner ball groove and a second inner ball groove on both lateral sides thereof; a first ball array having a plurality of balls which are movably disposed in a first ball track formed by a first inner ball groove and a first outer ball groove which are correspondingly formed on both lateral sides of the roller track; a second ball array having a plurality of balls which are movably disposed in a second ball track formed by a second inner ball groove and a second outer ball groove which are correspondingly formed on both lateral sides of the roller track; and a ball cage which restricts movements of the first ball array and the second ball array in a longitudinal direction thereof.

The first ball track may be formed such that a sectional area thereof becomes larger in a direction toward an open side of the outer joint member and the second ball track may be formed such that a sectional area thereof becomes smaller in a direction toward the open side of the outer joint member.

The t first ball track may have a shape of a truncated cone being widened in a direction toward the open side of the outer joint member and the second ball track may have a shape of a truncated cone being narrowed in a direction toward the open side of the outer joint member.

Center lines of the first ball track and the second ball track may be parallel respectively with a longitudinal direction of the outer joint member.

Advantageous Effects

According to the present invention, since the roller is realized by balls instead of a ring-shaped member, an increase of friction force at a large articulation angle can be minimized due to the geometrical characteristics of the ball.

DETAILED DESCRIPTION OF THE EMBODIMENTS

Embodiments of the present invention will be described hereinafter with reference to the accompanying drawings.

Figure 1:
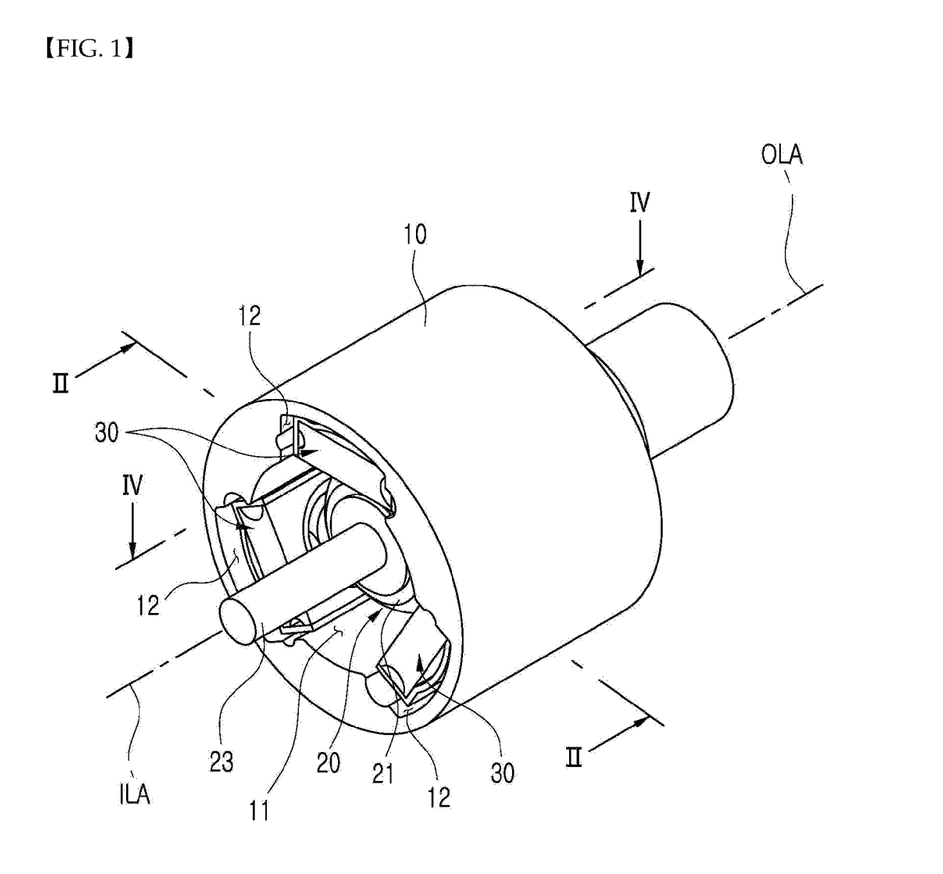
FIG. 1 is a perspective view of a tripod constant-velocity joint according to an embodiment of the present invention.

Referring to FIG. 1, a tripod constant-velocity joint according to an embodiment of the present invention includes an outer joint member 10 and an inner joint member 20.

Figure 2:
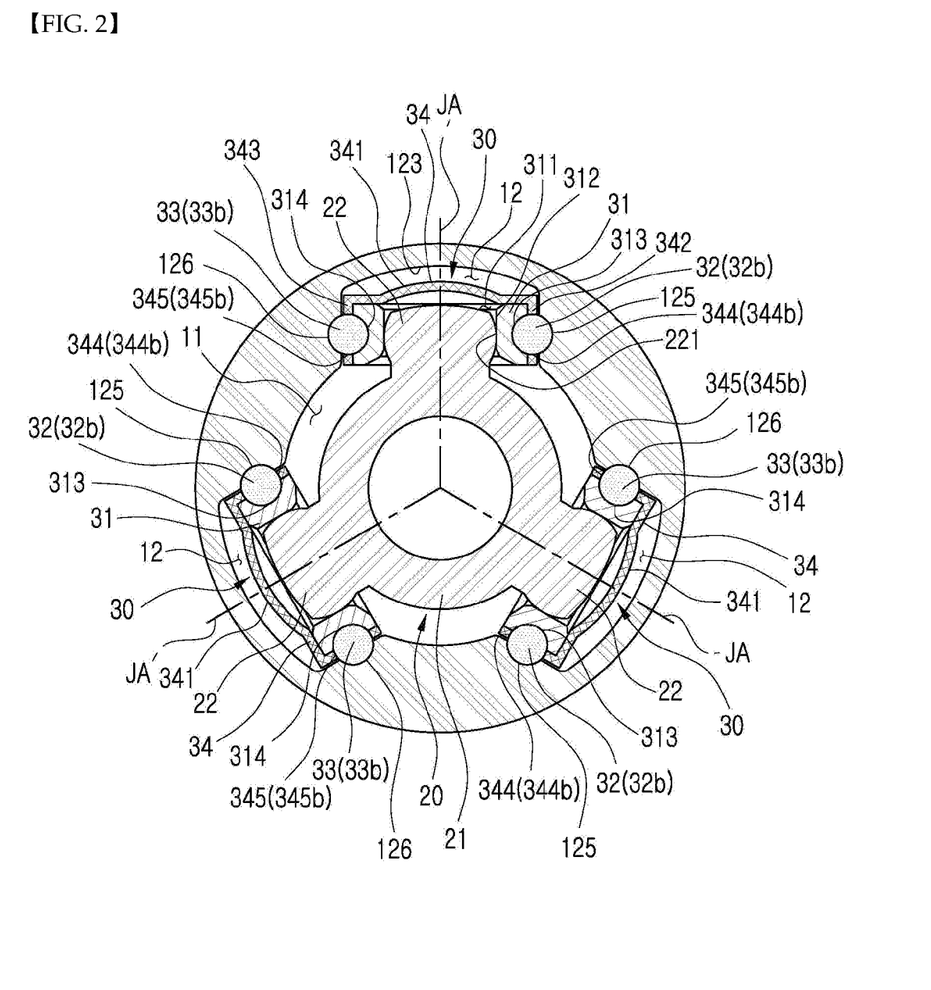
FIG. 2 is a sectional view taken along a line II-II in FIG. 1.

Referring to FIG. 1 and FIG. 2, the outer joint member 10 has a longitudinal axis OLA and is provided with a center cavity 11 and three roller tracks 12. One side of the outer joint member 10 is open to make the center cavity 11 exposed to the outside, and the other side thereof may be connected to a shaft for power transmission.

The center cavity 11 may approximately have a cylindrical shape, and the roller track 12 may have a shape of a recess indented in a radially outward direction from the center cavity 11 and may be elongated in a longitudinal direction. At this time, the three roller tracks 12 may be equidistantly disposed along a circumferential direction.

The inner joint member 20 is disposed within the center cavity 11 of the outer joint member 10. The inner joint member 20 includes a center body 21 and three journals 22 which are protruded in a radially outward direction from the center body 21. At this time, as shown in FIG. 2, the three journals 22 may be equidistantly disposed along a circumferential direction and are respectively disposed within the roller track 12 of the outer joint member 10.

A shaft 23 is connected to the center body 21, and the shaft 23 has a longitudinal axis ILA. The shaft 23 may be connected to the center body 21 so as to rotate therewith, and for example may be splined with the center body 21.

Three roller assemblies 30 are respectively coupled to the three journals 22. As shown in FIG. 1 and FIG. 2, the roller assembly 30 is disposed within the roller track 12 of the outer joint member 10 in a state of being coupled to the journal 22 of the inner joint member 20.

The roller assembly 30 is coupled to the journal 22 such that an articulation of the longitudinal axis ILA of the inner joint member 20 with respect to the longitudinal axis OLA of the outer joint member 10 can be allowed. Furthermore, the roller assembly 30 is disposed in the roller track 12 so as to be movable in a direction parallel with the longitudinal axis OLA of the outer joint member 10 along the roller track 12.

The respective roller assembly 30 includes an inner race 31, a first ball array 32, a second ball array 33 and a ball cage 34.

Figure 3:
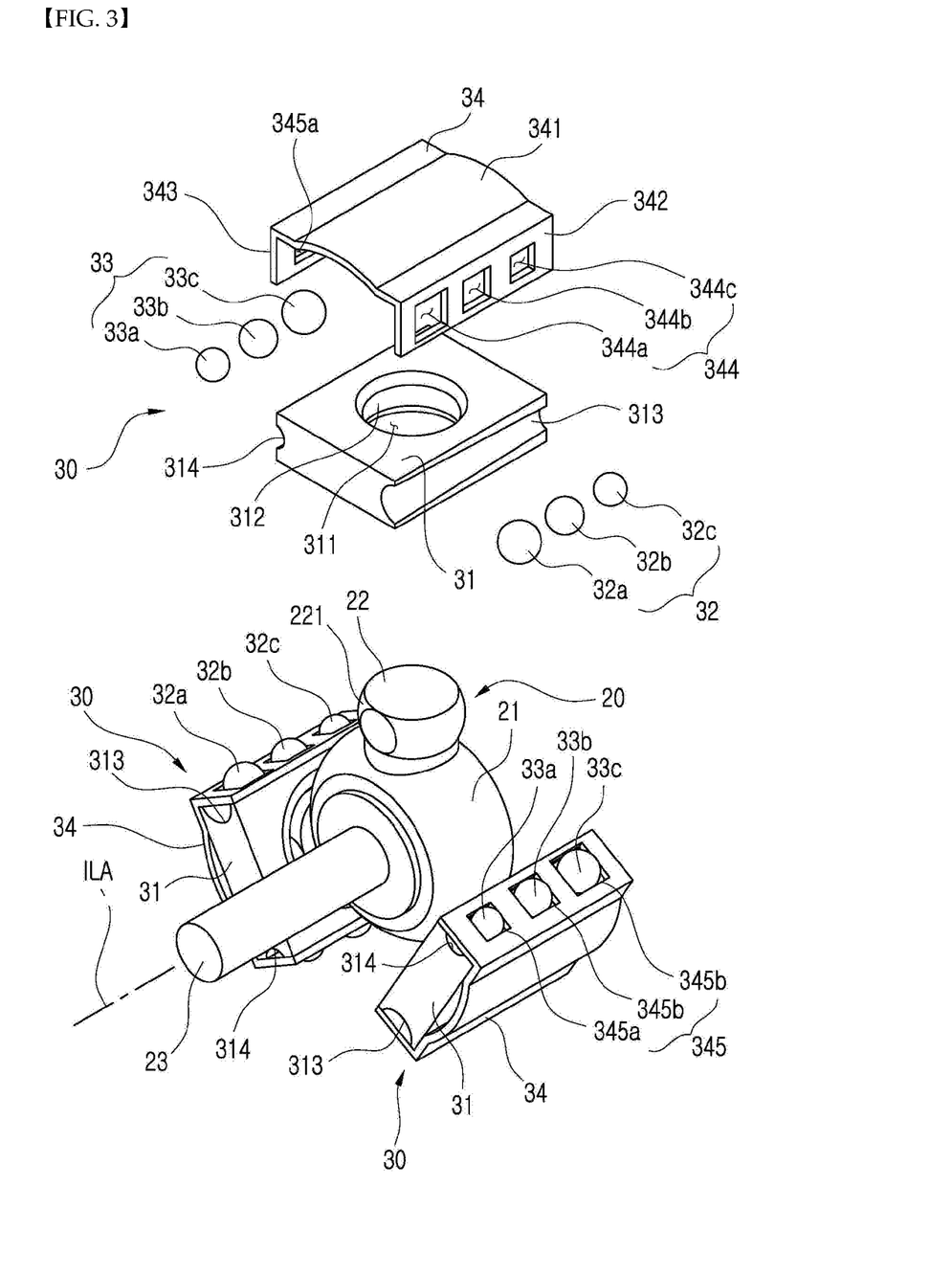
FIG. 3 is a perspective view of an inner joint member and roller assembles coupled thereto, one of the roller assemblies being exploded, of a tripod constant-velocity joint according to an embodiment of the present invention.

Referring to FIG. 2 and FIG. 3, the inner race 31 is connected to the journal 22. The inner race 31 may have an overall hexahedral shape and may have a through hole 311 formed in a center axis JA of the journal 22. The journal 22 of the inner joint member 20 is inserted into the through hole 311. At this time, a contact surface 312 forming the through hole 311 of the inner race 31 and an outer circumferential surface 221 of the journal 22 may respectively be formed in a curved surface to allow the inner joint member 20 to be articulated with respect to the inner race 31. For example, the outer circumferential surface 221 of journal 22 may be formed as a curved convex surface, and correspondingly the contact surface 312 forming the through hole 311 of the inner race 31 may be formed as a planar surface. That is, the contact surface 312 of the inner race 31 may have a cylindrical shape. Since the outer circumferential surface 221 of the journal 22 has a curved convex surface and the contact surface 312 forming the through hole 311 of the inner race 31 has a cylindrical shape, a movement of the journal 22 for an articulation of the joint can be ensured.

Meanwhile, a first inner ball groove 313 and a second inner ball groove 314 are respectively formed on both lateral sides of the inner race 31. The first and the second inner ball grooves 313 and 314 may be respectively elongated approximately in a direction parallel with the longitudinal axis OLA of the outer joint member 10 and may have a sectional shape of a semicircle.

The first ball array 32 including a plurality of balls 32a, 32b and 32c is disposed in the first inner ball groove 313. Similarly, the second ball array 33 including a plurality of balls 33a, 33b and 33c is disposed in the second inner ball groove 314. Although an embodiment in which the first and the second ball arrays 32 and 33 respectively include three balls are exemplarily shown in the drawings, the number of the balls is not restricted thereto.

A ball cage 34 restricts movements of the first ball array 32 and the second ball array 33 in a longitudinal direction. The ball cage 34 may include a central portion 341 which elongates approximately in a direction perpendicular to the center axis JA of the journal 22 to face the radially outward surface of the inner race 31, and a first wing portion 342 and a second wing portion 343 which are respectively extended in a radially inward direction from both lateral ends of the central portion 341. At this time, as shown in FIG. 3, the ball cage 34 may have a length similar to the inner race 31 in a longitudinal direction of the outer joint member 10. The central portion 341 of the ball cage 34 may be formed to be convex in an outward direction so as not to interfere with an outer end portion of the journal 22 of the inner joint member 20, and correspondingly a bottom surface 123 of the roller track 12 may be outwardly indented.

Referring to FIG. 2 and FIG. 3, the first wing portion 342 faces the first inner ball groove 313 and includes a first window array 344 having a plurality of windows 344a, 344b and 344c for respectively receiving the balls 32a, 32b and 32c composing the first ball array 32. Similarly, the second wing portion 343 faces the second inner ball groove 314 and includes a second window array 345 having a plurality of windows 345a, 345b and 345c for respectively receiving the balls 33a, 33b and 33c composing the second ball array 33. The respective window may be formed to receive the respective ball, and the ball is received in the window so that the movement thereof in a longitudinal direction is restricted.

Figure 4:
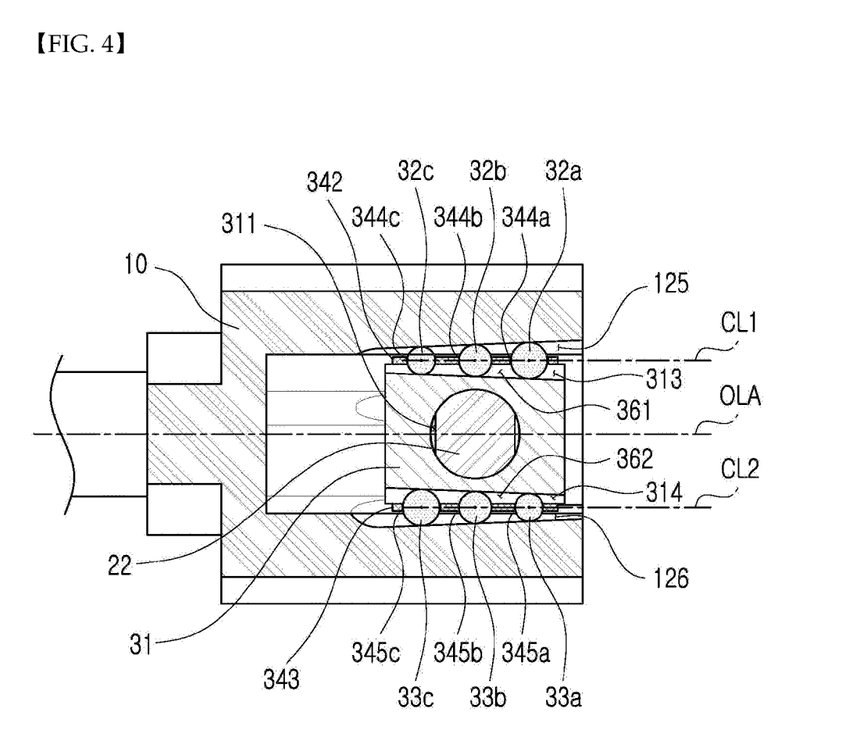
FIG. 4 is a sectional view taken along a line IV-IV in FIG. 1.

A first outer ball groove 125 and a second outer ball groove 126 which make a pair with the first inner ball groove 313 and the second inner ball groove 314 are respectively formed on both lateral sides of the roller track 12. Referring to FIG. 4, the first and the second outer ball grooves 125 and 126 may be elongated in a direction parallel with the longitudinal axis OLA of the outer joint member 10 so as to face the first and the second inner ball grooves 313 and 314. A first ball track 361 is formed by a combination of the first inner ball groove 313 and the first outer ball groove 125 facing one another, and a second ball track 362 is formed by a combination of the second inner ball groove 314 and the second outer ball groove 126 facing one another. The first ball array 32 is disposed in the first ball track 361, and the second ball array 33 is disposed in the second ball track 362. The balls 32a, 32b and 32c composing the first ball array 32 are disposed in the first ball track 361 in a state of being housed in the ball cage 34, inner portions thereof being disposed within the first inner ball groove 313 and outer portions thereof being disposed within the first outer ball groove 125, and the balls 33a, 33b and 33c composing the second ball array 33 are disposed in the second ball track 362 in a state of being housed in the ball cage 34, inner portions thereof being disposed within the second inner ball groove 314 and outer portions thereof being disposed within the second outer ball groove 126.

When a relative movement in a longitudinal direction between the inner joint member 20 and the outer joint member 10 occurs or the inner joint member 20 is articulated with respect to the outer joint member 10, the balls 32a, 32b, 32c, 33a, 33b and 33c roll so that the relative position of the roller assembly 30 with respect to the outer joint member 10 can be changed. Meanwhile, rotational driving power is transmitted between the outer joint member 10 and the inner joint member 20 via the balls 32a, 32b, 32c, 33a, 33b and 33c.

The balls and the ball grooves of the tripod constant-velocity according to an embodiment of the present invention will be described in more detail hereinafter with reference to FIG. 4 and FIG. 5. FIG. 4 shows a non-articulated state, and FIG. 5 shows a state in which the roller assembly relatively moves with respect to the outer joint member in an articulated state.

Figure 5:
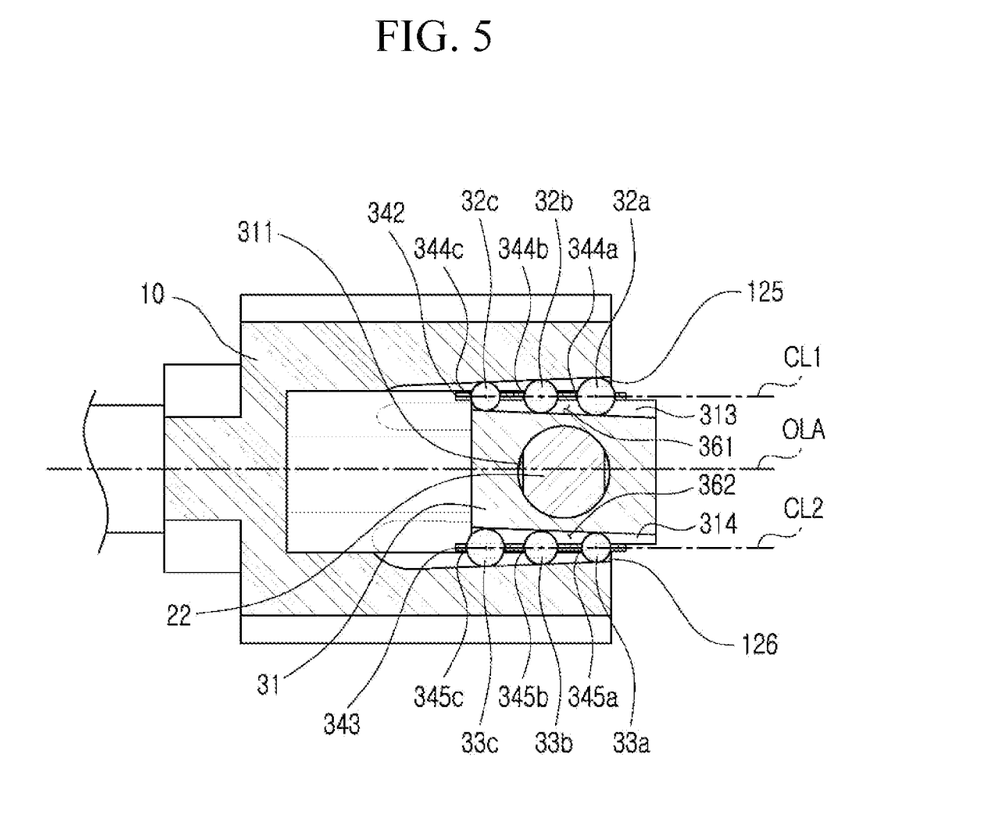
FIG. 5 is a drawing showing a state in which an axial displacement of a journal has been occurred in a tripod constant-velocity joint according to an embodiment of the present invention.

Referring to FIG. 4 and FIG. 5, the first ball track 361 can be formed such that a sectional area thereof becomes larger in a direction toward an open side (right side in FIG. 4) of the outer joint member 10, and to the contrary, the second ball track 362 may be formed such that a sectional area thereof becomes smaller in a direction toward an open side of the outer joint member 10. Correspondingly, diameters of the balls 32a, 32b and 32c composing the first ball array 32 may become greater in a direction toward an open side of the outer joint member 10, and diameters of the balls 33a, 33b and 33c composing the second ball array 33 may become smaller in a direction toward an open side of the outer joint member 10.

In detail, a bottom surface of the first inner ball groove 313 and a bottom surface of the first outer ball groove 125 may be formed to become deeper in a direction toward an open side of the outer joint member 10, and a bottom surface of the second inner ball groove 314 and a bottom surface of the second outer ball groove 126 may be formed to become shallower in a direction toward an open side of the outer joint member 10. The first ball track 361 may thereby have a shape of a truncated cone being widened in a direction toward an open side of the outer joint member 10, and the second ball track 362 may have a shape of a truncated cone being narrowed in a direction toward an open side of the outer joint member 10. At this time, a line CL1 connecting centers of the balls 32a, 32b and 32c composing the first ball array 32 and a line CL2 connecting centers of the balls 33a, 33b and 33c composing the second ball array 33 may be parallel with the longitudinal axis OLA of the outer joint member 10.

Since in an embodiment of the present invention the roller is realized by balls instead of a conventional ring member, an increase of a friction force can be minimized due to geometrical characteristic of a spherical ball even at a large articulation angle.

Also, by changing sizes of the balls and oppositely setting directions of increase/decrease of balls of the first and the second ball array, kinematic movement in a plunging or in an articulation can be realized. That is, the inner race and the ball are restricted by each other due to these structures, and hereby the balls can be prevented from being separated from the inner race and can be located at a desired region in the inner race.

Furthermore, by arranging center lines connecting centers of the balls composing the ball array to be parallel with a longitudinal direction of the joint, the rotation of the shaft under the conditions of the plunging or the articulation can be prevented so that the break of the components can be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a tripod constant-velocity joint, so it has an industrial applicability.

The invention claimed is:

1. A tripod constant-velocity joint comprising:
an outer joint member having a cavity elongated in a longitudinal direction and three roller tracks;

an inner joint member having a center body and three journals outwardly radially protruded from the center body; and three roller assemblies respectively coupled to the journal in a state of being respectively disposed in the roller tracks, wherein the respective roller assembly comprises:

an inner race which is connected to the journal and is provided with a first inner ball groove and a second inner ball groove on both lateral sides thereof;

a first ball array and a second ball array respectively having a plurality of balls which are respectively disposed in the first inner ball groove and in the second inner ball groove; and a ball cage which restricts movements of the first ball array and the second ball array in a longitudinal direction thereof, wherein the first ball array is disposed in a first ball track which is formed by the first inner ball groove and a first outer ball groove formed in a corresponding lateral side surface of one of the three roller tracks, and the second ball array is disposed in a second ball track which is formed by the second inner ball groove and a second outer ball groove formed in a corresponding lateral side surface of one of the three roller tracks, wherein the first ball track is configured such that a sectional area thereof becomes larger in a direction toward an open side of the outer joint member, and the second ball track is configured such that a sectional area thereof becomes smaller in a direction toward the open side of the outer joint member, and wherein diameters of the plurality of the balls composing the first ball array become larger in a direction toward the open side of the outer joint member, and diameters of the plurality of the balls composing the second ball array become smaller in a direction toward the open side of the outer joint member.

2. The tripod constant-velocity joint of claim 1, wherein the first inner ball groove is formed such that a bottom surface thereof becomes deeper in a direction toward the open side of the outer joint member and the second inner ball groove is formed such that a bottom surface thereof becomes shallower in a direction toward the open side of the outer joint member.

3. A tripod constant-velocity joint comprising:

an outer joint member having a cavity elongated in a longitudinal direction and three roller tracks;

an inner joint member having a center body and three journals outwardly radially protruded from the center body; and three roller assemblies respectively coupled to the journal in a state of being respectively disposed in the roller tracks, wherein the respective roller assembly comprises:

an inner race which is connected to the journal and is provided with a first inner ball groove and a second inner ball groove on both lateral sides thereof;

a first ball array and a second ball array respectively having a plurality of balls which are respectively disposed in the first inner ball groove and in the second inner ball groove; and a ball cage which restricts movements of the first ball array and the second ball array in a longitudinal direction thereof, wherein the first ball array is disposed in a first ball track which is formed by the first inner ball groove and a first outer ball groove formed in a corresponding lateral side surface of one of the three roller tracks, and the second ball array is disposed in a second ball track which is formed by the second inner ball groove and a second outer ball groove formed in a corresponding lateral side surface of one of the three roller tracks, wherein the first ball track is configured such that a sectional area thereof becomes larger in a direction toward an open side of the outer joint member and the second ball track is configured such that a sectional area thereof becomes smaller in a direction toward the open side of the outer joint member, and wherein the first outer ball groove is formed such that a bottom surface thereof becomes deeper in a direction toward the open side of the outer joint member and the second outer ball groove is formed such that a bottom surface thereof becomes shallower in a direction toward the open side of the outer joint member.

4. A tripod constant-velocity joint comprising:

an outer joint member having a cavity elongated in a longitudinal direction and three roller tracks;

an inner joint member having a center body and three journals outwardly radially protruded from the center body; and three roller assemblies respectively coupled to the journal in a state of being respectively disposed in the roller tracks, wherein the respective roller assembly comprises:

an inner race which is connected to the journal and is provided with a first inner ball groove and a second inner ball groove on both lateral sides thereof;

a first ball array and a second ball array respectively having a plurality of balls which are respectively disposed in the first inner ball groove and in the second inner ball groove; and a ball cage which restricts movements of the first ball array and the second ball array in a longitudinal direction thereof, wherein the first ball array is disposed in a first ball track which is formed by the first inner ball groove and a first outer ball groove formed in a corresponding lateral side surface of one of the three roller tracks, and the second ball array is disposed in a second ball track which is formed by the second inner ball groove and a second outer ball groove formed in a corresponding lateral side surface of one of the three roller tracks, wherein the first ball track is configured such that a sectional area thereof becomes larger in a direction toward an open side of the outer joint member and the second ball track is configured such that a sectional area thereof becomes smaller in a direction toward the open side of the outer joint member, and wherein the first ball track has a shape of a truncated cone being widened in a direction toward the open side of the outer joint member and the second ball track has a shape of a truncated cone being narrowed in a direction toward the open side of the outer joint member.

5. The tripod constant-velocity joint of claim 4, wherein center lines of the first ball track and the second ball track are parallel respectively with a longitudinal direction of the outer joint member.

6. A tripod constant-velocity joint comprising:

an outer joint member having a cavity elongated in a longitudinal direction and three roller tracks;

an inner joint member having a center body and three journals outwardly radially protruded from the center body; and three roller assemblies respectively coupled to the journal in a state of being respectively disposed in the roller tracks, wherein the respective roller assembly comprises:

an inner race which is connected to the journal and is provided with a first inner ball groove and a second inner ball groove on both lateral sides thereof;

a first ball array having a plurality of balls which are movably disposed in a first ball track formed by a first inner ball groove and a first outer ball groove which are correspondingly formed on both lateral sides of the roller tracks;

a second ball array having a plurality of balls which are movably disposed in a second ball track formed by a second inner ball groove and a second outer ball groove which are correspondingly formed on both lateral sides of the roller tracks; and a ball cage which restricts movements of the first ball array and the second ball array in a longitudinal direction thereof, wherein the first ball track is formed such that a sectional area thereof becomes larger in a direction toward an open side of the outer joint member, and the second ball track is formed such that a sectional area thereof becomes smaller in a direction toward an open side of the outer joint member, and wherein diameters of the plurality of the ball composing the first ball array become larger in a direction toward the open side of the outer joint member, and diameters of the plurality of the ball composing the second ball array become smaller in a direction toward the open side of the outer joint member.

7. A tripod constant-velocity joint comprising:

an outer joint member having a cavity elongated in a longitudinal direction and three roller tracks;

an inner joint member having a center body and three journals outwardly radially protruded from the center body; and three roller assemblies respectively coupled to the journal in a state of being respectively disposed in the roller tracks, wherein the respective roller assembly comprises:

an inner race which is connected to the journal and is provided with a first inner ball groove and a second inner ball groove on both lateral sides thereof;

a first ball array having a plurality of balls which are movably disposed in a first ball track formed by a first inner ball groove and a first outer ball groove which are correspondingly formed on both lateral of the roller track;

a second ball array having a plurality of balls which are movably disposed in a second ball track formed by a second inner ball groove and a second outer ball groove which are correspondingly formed on both lateral sides of the roller track; and a ball cage which restricts movements of the first ball array and the second ball array in a longitudinal direction thereof, wherein the first ball track is formed such that a sectional area thereof becomes larger in a direction toward an open side of the outer joint member, and the second ball track is formed such that a sectional area thereof becomes smaller in a direction toward an open side of the outer joint member, and wherein the first ball track has a shape of a truncated cone being widened in a direction toward the open side of the outer joint member and the second ball track has a shape of a truncated cone being narrowed in a direction toward the open side of the outer joint member.

8. The tripod constant-velocity joint of claim 7, wherein center lines of the first ball track and the second ball track are parallel respectively with a longitudinal direction of the outer joint member.

* * * * *